United States Patent [19]

Miller et al.

[11] Patent Number: 5,369,146
[45] Date of Patent: Nov. 29, 1994

[54] CARBON FIBER YARN HAVING IMPROVED HANDLING CHARACTERISTICS

[75] Inventors: James D. Miller, Roswell; Chris D. Levan, Alpharetta, both of Ga.

[73] Assignee: Amoco Corporation, Chicago, Ill.

[21] Appl. No.: 128,304

[22] Filed: Sep. 28, 1993

[51] Int. Cl.$^5$ .............................................. C08K 9/00
[52] U.S. Cl. .................................. 523/215; 428/367; 524/340; 524/375
[58] Field of Search ................ 428/367; 524/375, 340; 523/215

[56] References Cited

U.S. PATENT DOCUMENTS

| | | | |
|---|---|---|---|
| 3,837,904 | 9/1974 | Hill | 428/367 |
| 4,219,457 | 8/1980 | Taniguchi et al. | 428/367 |
| 4,331,573 | 5/1982 | Zabrocki et al. | 524/375 |
| 4,496,671 | 1/1985 | Yoshinaga et al. | 428/367 |
| 5,049,608 | 9/1991 | Medina | 524/375 |

FOREIGN PATENT DOCUMENTS

| | | |
|---|---|---|
| 45574 | 2/1982 | European Pat. Off. . |
| 3407279 | 8/1985 | Germany . |
| 49-23813 | 6/1974 | Japan . |
| 49-28889 | 7/1974 | Japan . |
| 49-33104 | 9/1974 | Japan . |
| 57-67664 | 4/1982 | Japan . |
| 7002278 | 9/1970 | Netherlands . |

*Primary Examiner*—Veronica P. Hoke
*Attorney, Agent, or Firm*—Richard J. Schlott; Stephen L. Hensley

[57] ABSTRACT

A sizing formulation adapted for use with carbon fiber yarn comprising an aqueous dispersion of a film-forming, heat-reactive resin having a Tg below about −50° C. and a water-dispersible ethoxylated alkyl phenol provides yarn having improved resistance to abrasion, less breakage and low fuzz formation, permitting substantial handling of the fiber in fabrication and weaving operations with reduced losses. In addition, the sizing may be readily removed thermally without the production of noxious byproducts when deemed necessary for use in further processing and impregnation operations.

5 Claims, No Drawings

CARBON FIBER YARN HAVING IMPROVED HANDLING CHARACTERISTICS

This invention was made with Government support under Contract N0014-91-C-0122 awarded by the Department of the Navy.

BACKGROUND OF THE INVENTION

This invention relates to carbon fibers and more particularly to continuous carbon fiber yarn having improved handling characteristics including increased abrasion resistance, together with reduction in yarn breakage and low fuzz generation during processing, and to a method for improving the handling characteristics of carbon fiber yarn. While continuous carbon fiber yarn from a variety of sources may be improved when produced according to the invention, high modulus carbon fiber yarns including those comprising pitch-based carbon fibers are particularly benefited.

Carbon fibers have long been known, and methods for their production from a variety of precursors are well-described in the art. Cellulosic precursors have been used for producing carbon fiber since the early 1960's, with rayon being the dominant carbon fiber precursor for nearly two decades. More recently, as the art has developed methods for producing carbon fiber derived from such materials as polyacrylonitrile (PAN) and pitch, the importance of rayon-based carbon fiber has declined. This shift has been due in part to the superior toughness, tensile strength and stiffness exhibited by both PAN-based and pitch-based carbon fiber.

Polyacrylonitrile fiber, when oxidized and carbonized under appropriate conditions, provides tough, high strength, high modulus carbon fiber. The overall conversion yield in producing fiber from PAN is good, and the finished fiber is capable of achieving the outstanding tensile strength needed for producing the high performance composite materials used in a variety of sports, automotive and aircraft applications. However, the tensile modulus of commercially available PAN-based fiber does not generally exceed about $50 \times 10^6$ psi, which is somewhat deficient for use in applications that require a high degree of stiffness.

Pitch-based carbon fiber has generally been recognized as capable of providing greater stiffness than carbon fiber from other sources, and considerable effort has been directed toward the development of pitch-based ultra-high modulus carbon fibers.

Such carbon fibers find application in forming composites for use where good dissipation of electrical charges or heat is desired. In addition, the combination of high stiffness and good thermal conductivity with the negative coefficient of thermal expansion characteristically exhibited by pitch-based fibers provides composites that are extraordinarily dimensionally stable.

Carbon fibers are widely used in the manufacture of aircraft parts, space devices, precision machines, transport devices, sporting goods, and the like because of their excellent mechanical properties, such as specific strength, specific modulus, and chemical resistance. In such uses the carbon fiber is ordinarily used as reinforcement in composite materials comprising a matrix component such as a metal, graphitic carbon, a ceramic, a synthetic resin or the like. Carbon fiber-reinforced composites having synthetic resins as a matrix have found wide acceptance in view of the versatility, uniformity in performance and cost.

Fabricating composites is generally accomplished by processes such as filament winding, and by layup and impregnation using tape and fabric woven from carbon fiber yarns. These processes generally require contacting the yarn with rollers, guides, spreaders and the like. Continuous carbon fiber, particularly including those carbon fibers having high tensile modulus values designated in the art as "ultra-high modulus", characteristically exhibit poor abrasion resistance and can be regarded as brittle and difficult to handle. The conventional processing thus tends to damage the carbon filaments, which in turn may cause undesirable fuzz, flaws in the resulting composites and loss in production due to yarn breakage. A variety of sizes and filer coatings have been devised for use with carbon fiber to improve abrasion resistance and reduce losses.

U.S. Pat. No. 3,837,904 discloses coating the carbon fiber with from 5 to 60 volume per cent of a resin formulation as a size to improve bonding between the matrix and the fiber surface. The coating is generally accomplished after fast surface treating the fiber to etch or pit the surface. The fiber is said to exhibit improved abrasion resistance and reduce fuzzing. Additional sizes are known in the art for this purpose, including, for example, those described in U.S. Pat. No. 4,219,457 and U.S. Pat. No. 4,496,671. Although improvement in handling characteristics is realized for these formulations, as the art has turned to use of higher modulus carbon fiber yarn and to more complex and more demanding forming processes and equipment, the prior art sizes have been found inadequate. Further, the use of woven structures for composite fabrication has found greater acceptance in the art. The processes and equipment used in weaving complex structures place great stress on yarn and tow surfaces and significantly increases the possibility of damage. In addition, bonding between the fiber and the matrix component that will subsequently be impregnated into the structure is greatly affected by the presence of the size, and it is often desirable to remove the size after weaving, ordinarily in a thermal operation. Prior art sizes, particularly those that are cross-linked, may be difficult to cleanly remove without causing fiber damage.

Methods and sizing formulations for carbon fiber that provide improved yarn abrasion resistance and handling character, particularly for high modulus continuous carbon fiber yarn, and that are readily removed after the fabrication operations would thus be a useful advance in the composite manufacturing art.

SUMMARY OF THE INVENTION

The sized continuous carbon fiber yarns of this invention are sized with low Tg, film-forming resin. The yarns exhibit improved handleability and better visual appearance over sized carbon fiber yarn of the prior art, and produce fewer breaks and less fuzz during winding and fabrication.

DETAILED DESCRIPTION

The sized, continuous carbon fiber yarns of this invention comprise a plurality of continuous carbon fiber or filaments, together with a sizing comprising a low Tg, film-forming resin and a lubricant.

The carbon fiber yarns useful in the practice of the invention will include any of the conventional carbonized or graphitized fiber yarn obtained by known processes from such organic fiber or filament precursors as rayon, polyacrylonitrile pitch or the like. Although carbon fiber yarns generally will exhibit improved handleability when employed in the practice of this invention, high density, pitch-based continuous carbon fibers having an ultra-high modulus as reflected in a tensile modulus greater than about $100 \times 10^6$ psi are generally found to exhibit greater brittleness and tendency to break in flexing, and the improvement in handleability will be more apparent than for lower modulus fiber. Hence, yarns comprising such high modulus fiber will be preferred. The term yarn as employed herein is intended to be understood to mean any of the commonly-employed carbon filament bundles commercially available and widely described variously as tow, yarn, roving or strand. Such yarn will generally consist of a plurality of carbon fibers or filaments, preferably from as few as 500 to as great as 50,000 filaments or more having a diameter of about 1 to 10 μm.

The sizing formulation according to this invention comprises a film-forming resin and a lubricant. The film-forming resins employed as a component of the sizing will be further characterized as having a Tg of less than about −50° C., preferably in the range of from about −50° C. to about −70° C., and still more preferably from about −55° C. to about −70° C. Film-forming character is necessary to in order to adequately coat and protect the yarn. Resins with higher Tg values tend to increase yarn stiffness and do not adequately reduce breakage and fuzz formation. Particularly desirable low Tg resins are the acrylic ester resins, including copolymer and terpolymer resins, and polyester urethanes. These resins are widely available in the form of an aqueous anionic dispersion or latex from commercial sources. A variety of low Tg elastomeric copolymers and terpolymers are available from commercial sources, and aqueous dispersions of these resins may also be found suitable for these purposes. The lubricant component of the sizing formulation will generally be a water-dispersible or water soluble lubricant effective to provide good lubricity and softness to the yarn. Particularly useful for these purposes are ethoxylated nonylphenols having a hydrophylic-lypophilic balance near 15, generally from about 14 to about 16. These materials are readily available commercially in the form of waxes or solids at room temperature from a variety of sources. Ethoxylates with lower balance values tend to be liquids and, while these are capable of increasing softness, they do not provide the necessary lubricity.

A particularly desirable feature of the sizing formulations useful in the practice of the invention is the fugitive nature of the resulting finish. That is, the sizing is readily removed from the yarn by thermal means. The sizing on the yarn affords the yarn with sufficient abrasion resistance to permit fabrication into a preform by means such as weaving or winding. However, in the subsequent steps of forming a composite by impregnation of the fabric or preform structure with a resin or other matrix material, the presence of the sizing may reduce wetting of the fiber surfaces and cause a substantial reduction in adhesion between the matrix and the yarn, detrimentally affecting the mechanical properties of the final composite. Where removal of the sizing is desired, the art generally will employ thermal means such as firing to remove the fiber finish and provide a preform with cleaned fiber surfaces for impregnation with matrix material. The sizing formulation comprising the low Tg film-forming resin and lubricant according to the invention is readily removed by such thermal means when deemed necessary and, inasmuch as there are no metallic residues or other contaminants associated with the components of the sizing, there is minimal possibility of producing noxious byproducts.

According to one feature of the present invention, the yarn is treated with the above-defined sizing agent so that the film-forming resin is deposited on the surface, thereby imparting to the treated carbon fiber yarn an excellent abrasion resistance, and making it extremely handleable. Yarn sized according to this invention may thus find further application in the form of tow, or in the form of tape, particularly for use where resistance to abraiding is important, such as in the fabrication of carbon fiber preforms.

Sized continuous carbon fiber yarn, according to the present invention, may be produced, basically, by dipping a continuous carbon fiber yarn into an aqueous dispersion sizing agent as defined herein before and then drying and heat treating the carbon fiber yarn. Generally, the process for applying the size is conventional and may include the steps of pulling the yarn from a payoff creel by a downstream winder, passing the yarn through the application bath to impregnate the yarn and then through a dryer means such as a heated tube, preferably a forced hot air drying tube having one or more temperature-controlled zones, and then winding the yarn onto a takeup spool. It is very advantageous in order to obtain a carbon fiber yarn having a high abrasion resistance to subject the carbon fiber yarn after being impregnated with the size to drying and heat treating by passing through a plurality of heating zones progressing through the range of temperatures from about 150° C. to about 250° C. at a rate that will provide a drying period of from 0.5 to 2.0 minutes. If the final temperature is lower than about 180° to 200° C. or the heating time is less than 0.5 minute, the removal of moisture may not be satisfactory and the resultant carbon fiber yarn may then become stuck together when wound on the takeup spool or otherwise detrimentally affected and exhibit poor handling character. On the other hand, if the temperature is substantially higher than 250° C. or the heating time is excessive, the sizing agent may be destroyed or seriously damaged and thus will not afford adequate abrasion protection to the yarn.

The invention will be better understood by consideration of the following Examples, which are provided by way of illustration of the invention and are not intended to be limiting thereof. In the Examples, all parts are by weight, and all temperatures are given in Centigrade unless otherwise noted.

EXAMPLES

The following materials and formulations are employed in the Examples.

Latex I: Film-forming, heat-reactive acrylic ester rubber latex having Tg −55° C., obtained in a 50 wt % solids latex as as Hycar Acrylic Latex 26146 from B. F. Goodrich Chemical Company.

Latex II: Film-forming, heat-reactive acrylic ester rubber latex having Tg −12° C., obtained in a 52 wt % solids latex as Hycar Acrylic Latex 26092 from B. F. Goodrich Chemical Company. Latex III: Film-forming, heat-reactive aliphatic polyester urethane having a Tg of −66° C., obtained as Hycar U-66 latex from B.F. Goodrich Chemical Company.

DM-730: Ethoxylated nonylphenol non-ionic surfactant having a HLB value of about 15, obtained as IGEPAL DM-730 from Rhone-Poulenc Chemical Company.

CO-970: Ethoxylated nonylphenol non-ionic surfactant having a HLB value of about 15, obtained from from Rhone-Poulenc Chemical Company as Igepal CO-630

Sizing A: Aqueous dispersion of a bisphenol epoxy-modified aromatic urethane having a Tg above 20° C., described in U.S. Pat. No. 4,219,457.

Test Procedures

Bend Radius, Spiking and Visual Appearance are used as the basis of comparison between sized fiber yarns. Bend Radius is the minimum radius bend the fiber can withstand, determined by bending the yarn on drill blanks graduated in 64ths of an inch. The results are assigned a ranking on the basis of <16/64=1 (excellent); 16-20/64=2; 21-25/64=3; 26-30/64=4 and >30/64=5 (extremely poor).

The Spiking and Visual Appearance ratings are made by having an experienced carbon fiber yarn fabrication technician assign a subjective rating. Spiking is a measure of stiffness and likelihood of kinking, determined visually and assigned the subjective rating of from 1 (excellent) to 5 (extremely poor).

Visual Appearance is the subjective rating of the appearance of the fiber wound on the spool, and includes fiber sheen, presence of fuzz, and the like.

Examples 1-12 and Control Examples A-N

In preparing sized fiber for evaluation, continuous carbon fiber yarn having a Youngs modulus (nominal) of 130 Mpsi, obtained as K-1100X pitch-based carbon fiber from Amoco Performance Products, Inc., was sized by applying an aqueous dispersion of the sizing formulation using conventional sizing methods. Level of size pickup was controlled to the desired level by adjusting solids concentration in the aqueous dispersion or latex.

The sizing formulation was prepared by thoroughly mixing the requisite amounts of aqueous laticies or dispersions of film-forming resin and ethoxylated alkyl phenol, together with sufficient deionized water to provide an aqueous dispersion of the components at the desired solids level. The formulations are summarized in Table I.

The yarn was pulled at a rates of from 8 to 15 ft/min, passing through a dip bath containing the sizing formulation, then through a 3-zone tube heater to dry the coated yarn, and finally wound on a take-up spool. The heat zones were set depending on the particular latex employed and the supplier's recommendations, generally in the range of from 150° to about 250° C., while heated air, generally at a temperature of from 80° to about 120° C., was passed through the hot tube. The fiber, on exiting the tube and cooling, was dry and tack-free.

TABLE I

| Example No. | Acrylic Latex I[1] wt %[2] | Surfactant Identif.[1] | Surfactant wt %[2] | Bend Radius rank[3] | Spiking rank[3] | Visual rank[3] |
|---|---|---|---|---|---|---|
| 1 | 2 | DM-730 | 4 | 2 | <1 | 2 |
| 2 | 2 | " | 1 | 2 | 4 | 2 |
| 3 | 1 | " | 2 | 2 | 2 | 2 |
| 4 | 1 | " | 0.5 | 1 | 2 | 2 |
| 5 | 1 | " | 0.25 | 2 | 3 | 2 |
| 6 | 0.5 | " | 0.25 | 2 | 3 | 4 |
| 7 | 0.5 | " | 0.125 | 2 | 2 | 5 |
| A | 8 | — | — | 4 | 5 | 1 |
| B | 4 | — | — | 3 | 4 | 2 |
| C | 2 | — | — | 2 | 3 | 2 |
| D | 1 | — | — | 2 | 3 | 1 |
| E | 0.5 | — | — | 1 | 2 | 3 |
| F | — | DM-730 | 8 | 1 | 1 | 5 |
| G | — | " | 4 | 1 | 1 | 5 |
| H | — | " | 2 | 1 | 1 | 5 |
| I | — | " | 1 | 1 | 2 | 5 |
| 8 | 1 | CO-970 | 0.5 | 1 | 2 | 3 |
| 9 | 1 | " | 0.25 | 2 | 2 | 2 |
| J | — | CO-970 | 2 | 1 | 1 | 5 |

Notes:
[1]Sizing formulation components, see text;
[2]Wt % of component in aqueous dispersion or latex applied to the yarn.
[3]Rank is rating given the yarn; see text.

It will be seen that the combination of film-forming resin and surfactant or lubricant provides substantial improvement in handling properties over either component alone. The spiking level, a measure of stiffness, is improved with the appropriate level of lubricant, but fiber with acceptable visual ratings and good handling are afforded only with the combination with the resin component.

Comparative Example K

A sizing formulation comprising 2 wt % Latex II and 1% DM730 was applied to K-1100X carbon fiber yarn following substantially the same procedures. The resulting sized yarn had a Spiking ranking of 5.

Comparative Example L

The carbon fiber yarn sized with 2 wt % Latex II had a Spiking ranking of 5 and a Bend Radius ranking of 2.

Comparative Example M

A 2 wt % solids dispersion of Sizing A was applied to K-1100X carbon fiber yarn following substantially the same procedures. Epoxy-modified urethanes are widely used in the art as fiber treatment resins. The epoxy-sized carbon fiber yarn had a Spiking ranking of 4, a Bend Radius ranking of 5 and a Visual ranking of 5. The fiber had poor abrasion resistance, judged by the presence of 792 frays per 100 ft.

Comparative Example N

A 2 wt % solids dispersion of polyvinyl alcohol, Tg about 80° C., was applied to K-1100X carbon fiber yarn following substantially the same procedures. Polyvinyl alcohol is well knownd and widely used in the fiber treating art as a sizing. The polyvinyl alcohol-sized yarn had a Bend Radius ranking of 5 and poor abrasion resistance.

Example, 10

K-1100X carbon fiber yarn sized with an aqueous dispersion of 1.5 wt % Latex I and 2 wt % DM-730 following substantially the same procedures had a Bend Radius ranking of 2 and a Visual ranking of 1. The fiber had poor abrasion resistance, judged by the presence of 792 frays per 100 ft. The fiber had excellent abrasion resistance, judged by the presence of 144 frays per 100 ft.

Example 11

A sizing formulation comprising an aqueous dispersion of 1.5 wt % film-forming acrylic terpolymer emulsion having a Tg of −60° C. and 2 wt % DM-730, when applied to K-1100X carbon fiber yarn following substantially the same procedures provides fiber yarn with a Visual ranking of 1.

Example 12

A sizing formulation comprising an aqueous dispersion of 1 wt % Latex III and 2 wt % DM-730, when applied to K-1100X carbon fiber yarn following substantially the same procedures provides fiber yarn with a Visual ranking of 1.

The invention will thus be seen to be a sized continuous carbon fiber yarn wherein the size is an aqueous dispersion comprising from about 0.25 to about 4 wt % of a film-forming elastomer, preferably a film-forming, heat-reactive acrylic ester or aliphatic polyester urethane having a Tg value of less than about −50° C. and from about 0.25 to about 4 wt % of a water-dispersable ethoxylated alkyl phenol having a hydrophyliclipophilic balance in the range 14 to about 16, preferably about 15. Preferably, the acrylic ester component will have a Tg value in the range of from about −50° C. to about −70° C.

The invention has been described and illustrated by way of specific embodiments set forth herein. Although the size formulation are thus described are characterized as comprising particular film-forming acrylic ester and lubricant components, those skilled in the art will recognize that equivalent water-dispersable, low-Tg film-forming resins and surfactants are available, and that alternative methods of applying the sizing are widely known and practiced in the art, and such alternative materials, methods and processes will be considered to lie within the scope of the invention. Still further modifications and variations will also be apparent to those skilled in the fiber manufacturing and composite fabricating arts and such variations and modifications will be included within the scope of the invention as defined by the appended claims.

We claim:

1. A sizing formulation adapted for use with carbon fiber yarn comprising an aqueous dispersion of from about 0.5 to about 4 wt % of a film-forming, heat-reactive resin selected from the group consisting of acrylic ester resins and aliphatic polyester urethane resins, said resin having a Tg in the range of from about −50° C. to about −65° C. and from about 0.5 to about 4 wt % of a water-dispersible ethoxylated nonylphenol having a hydrophylic-lipophylic balance in the range of from about 14 to about 16.

2. A carbon fiber yarn having from about 0.5 to about 10 wt % of a sizing comprising a film-forming, heat-reactive resin selected from the group consisting of acrylic ester resins and aliphatic polyester urethane resins, said resin having a Tg below about −50° C. and a water-dispersible ethoxylated alkyl phenol, said resin and said ethoxylated alkyl phenol being present in a weight ratio of from about 2:1 to about 1:2.

3. The carbon fiber yarn of claim 2 wherein said resin has a Tg in the range of from about −50° C. to about −70° C.

4. The carbon fiber yarn of claim 2 wherein said ethoxylated alkylphenol has a hydrophylic-lipophylic balance in the range of about 15.

5. The carbon fiber yarn of claim 4 wherein said ethoxylated alkylphenol is ethoxylated nonylphenol.

* * * * *

UNITED STATES PATENT AND TRADEMARK OFFICE
CERTIFICATE OF CORRECTION

PATENT NO. : 5,369,146  Page 1 of 2
DATED : November 29, 1994
INVENTOR(S) : James D. Miller, Chris D. Levan It is certified that error appears in the above-indentified patent and that said Letters Patent is hereby corrected as shown below:

| Col. | Line | | |
|---|---|---|---|
| 1 | 6 | "Contract N0014-91-C-0122" should read | --Contract N00014-91-C-0122-- |
| 1 | 19 | "carbon fiber yams" should read | --carbon fiber yarns-- |
| 2 | 4 | "fiber yams." should read | --fiber yarns.-- |
| 2 | 4-5 | "contacting the yam" should read | --contacting the yarn-- |
| 2 | 28-29 | "carbon fiber yam" should read | --carbon fiber yarn-- |
| 2 | 34-35 | "yam and tow surfaces" should read | --yarn and tow surfaces-- |
| 2 | 45 | "improved yam abrasion" should read | --improved yarn abrasion-- |
| 2 | 60 | "carbon fiber yams" should read | --carbon fiber yarns-- |

UNITED STATES PATENT AND TRADEMARK OFFICE
CERTIFICATE OF CORRECTION

PATENT NO. : 5,369,146

DATED : November 29, 1994

INVENTOR(S) : James D. Miller, Chris D. Levan

It is certified that error appears in the above-indentified patent and that said Letters Patent is hereby corrected as shown below:

| Col. | Line | |
|---|---|---|
| 2 | 64 | "The carbon fiber yams" should read --The carbon fiber yarns-- |
| 2 | 66 | "graphitized fiber yam" should read --graphitized fiber yarn-- |
| 3 | 9 | "yams comprising such high modulus fiber" should read --yarns comprising such high modulus fiber-- |
| 3 | 10 | "The term yam as employed herein" should read --The term yarn as employed herein-- |

Signed and Sealed this

Fourteenth Day of March, 1995

Attest:

BRUCE LEHMAN

Attesting Officer    Commissioner of Patents and Trademarks